(12) United States Patent
Knopf

(10) Patent No.: US 11,331,231 B2
(45) Date of Patent: May 17, 2022

(54) MOUNTING UNIT, CASTER WHEEL ASSEMBLY AND WHEELCHAIR

(71) Applicant: Sunrise Medical GmbH, Malsch (DE)

(72) Inventor: Michael Knopf, Kaiserslautern (DE)

(73) Assignee: Sunrise Medical (US) LLC, Fresno, CA (US)

(*) Notice: Subject to any disclaimer, the term of this patent is extended or adjusted under 35 U.S.C. 154(b) by 280 days.

(21) Appl. No.: 16/504,543

(22) Filed: Jul. 8, 2019

(65) Prior Publication Data

US 2020/0022854 A1 Jan. 23, 2020

(30) Foreign Application Priority Data

Jul. 19, 2018 (DE) .................. 10 2018 117476.4

(51) Int. Cl.
*A61G 5/10* (2006.01)
*B60B 33/00* (2006.01)
*B60B 33/04* (2006.01)

(52) U.S. Cl.
CPC ............ *A61G 5/10* (2013.01); *B60B 33/0005* (2013.01); *B60B 33/04* (2013.01)

(58) Field of Classification Search
CPC ............ B60B 33/0005; B60B 33/0007; B60B 33/0021; B60B 33/0039; B60B 33/02;
(Continued)

(56) References Cited

U.S. PATENT DOCUMENTS 4,969,232 A * 11/1990 Michel ................ B60B 33/0002
16/350
6,354,390 B1 * 3/2002 Uchiyama ............. A61G 5/045
180/65.1
(Continued)

FOREIGN PATENT DOCUMENTS

DE 20221587 U1 8/2006
JP H09220261 A1 8/1997

OTHER PUBLICATIONS

JPH09220261A1 English EPO Machine Translation, 1997.
(Continued)

*Primary Examiner* — Minnah L Seoh
*Assistant Examiner* — Hosam Shabara
(74) *Attorney, Agent, or Firm* — MacMillan, Sobanski & Todd, LLC

(57) ABSTRACT

A mounting unit for adjustably mounting an add-on piece to a frame, in particular of a wheelchair, includes at least one drum receiving unit having at least one aperture and female thread. The drum receiving unit is an integral part of the frame or adapted to be attached to the frame. At least one drum assembly has at least one hole and a male thread. At least one bolt is part of the add-on piece or adapted to be mounted therewith to hold the add-on piece. The drum receiving unit is adapted to receive the drum assembly. The female thread mates with the male thread and allows an alignment of the position of the hole with respect to the aperture, such that the bolt can be inserted through the aperture at least partly into the hole. The drum receiving unit with the drum assembly and/or the drum assembly with the bolt comprises a detachable form fit connection. At least one of the drum receiving unit, the drum assembly and/or the bolt comprises a detachable force fit connection with respective mating component.

16 Claims, 14 Drawing Sheets

(58) Field of Classification Search
CPC ... B60B 33/025; B60B 33/04; B60B 2200/22; B60Y 2200/84; A61G 5/1083; A61G 5/1097
USPC .......... 280/250.1, 86.751; 16/19, 29, 30, 38
See application file for complete search history.

(56) References Cited

U.S. PATENT DOCUMENTS

| | | | |
|---|---|---|---|
| 7,011,321 B2* | 3/2006 | Hargroder | A61G 5/10 280/250.1 |
| 8,256,786 B2* | 9/2012 | Ludovici | B60B 33/04 280/250.1 |
| 8,662,516 B1 | 3/2014 | Slagerman | |
| 2004/0017058 A1 | 1/2004 | Hargroder | |

OTHER PUBLICATIONS

DE20221587U1 English EPO machine translation, 2006.
EPO Office Action DE10 2018 117 476.4, dated Nov. 28, 2018; EPO Machine Translation.

* cited by examiner

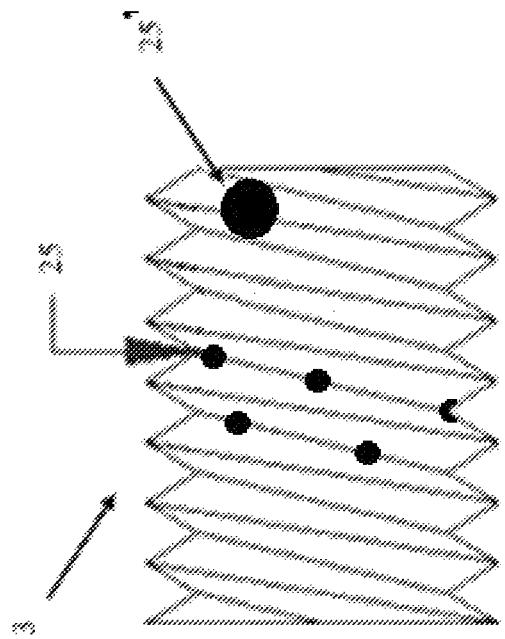
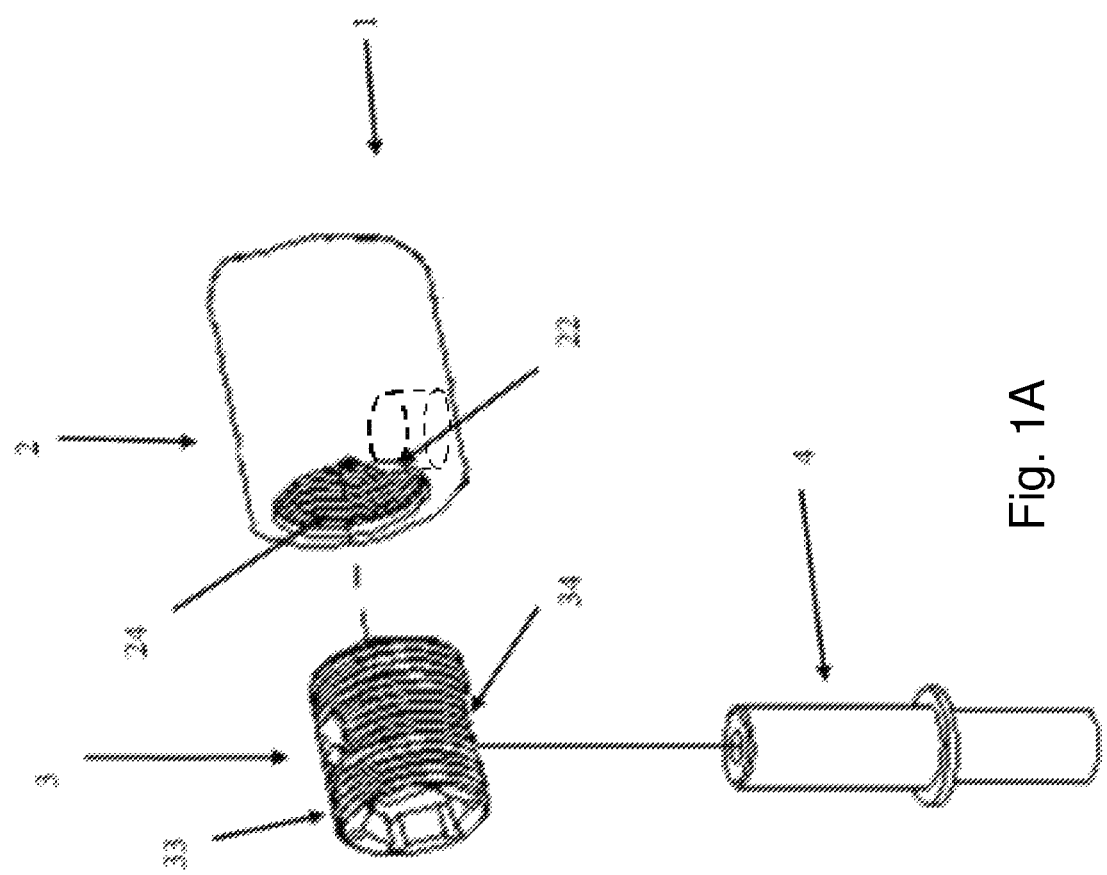
Fig. 1A
Fig. 1B

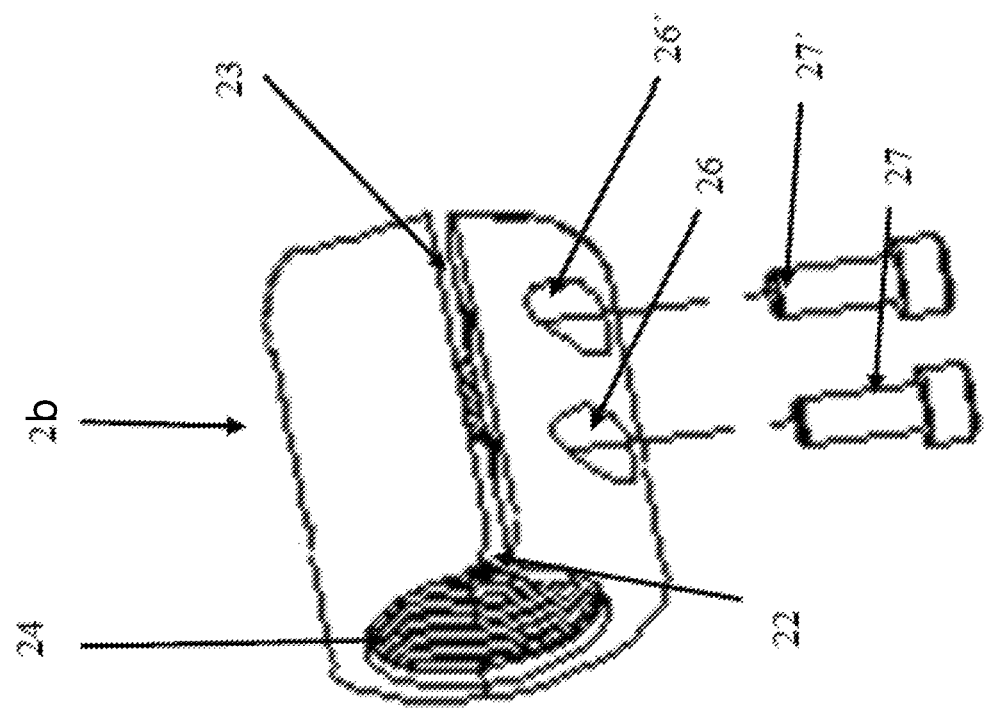
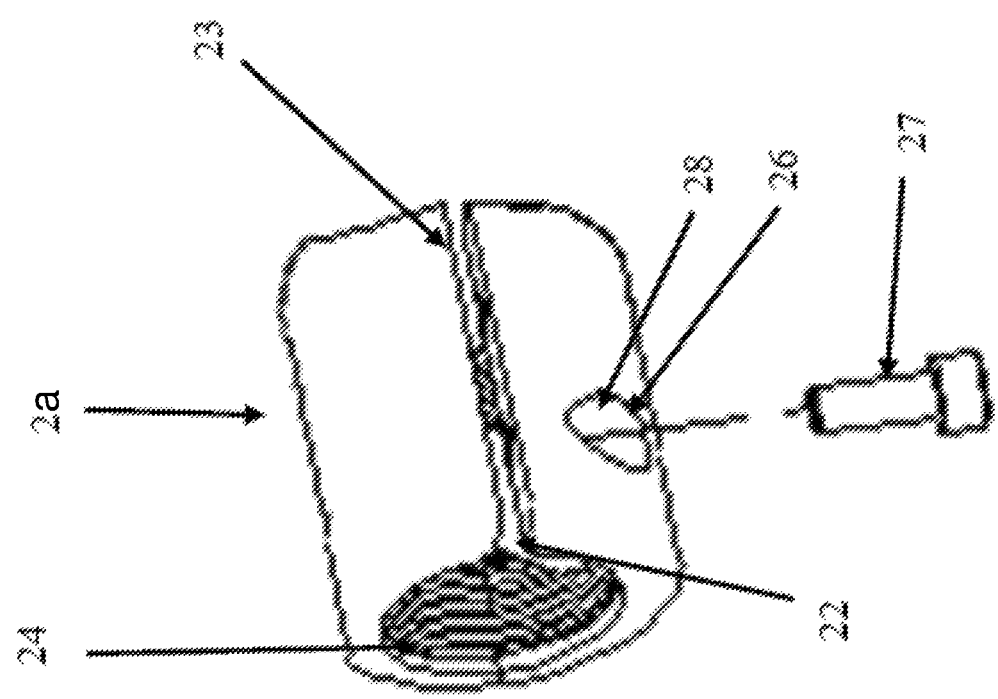
Fig. 2A
Fig. 2B

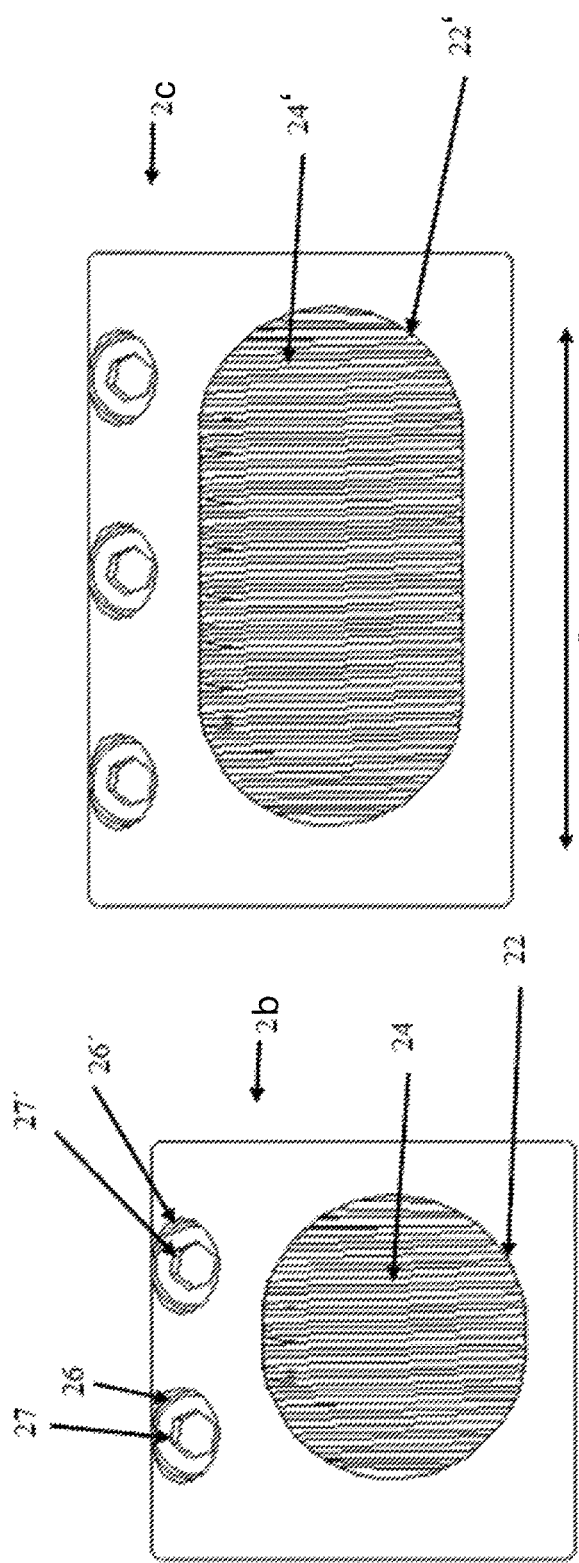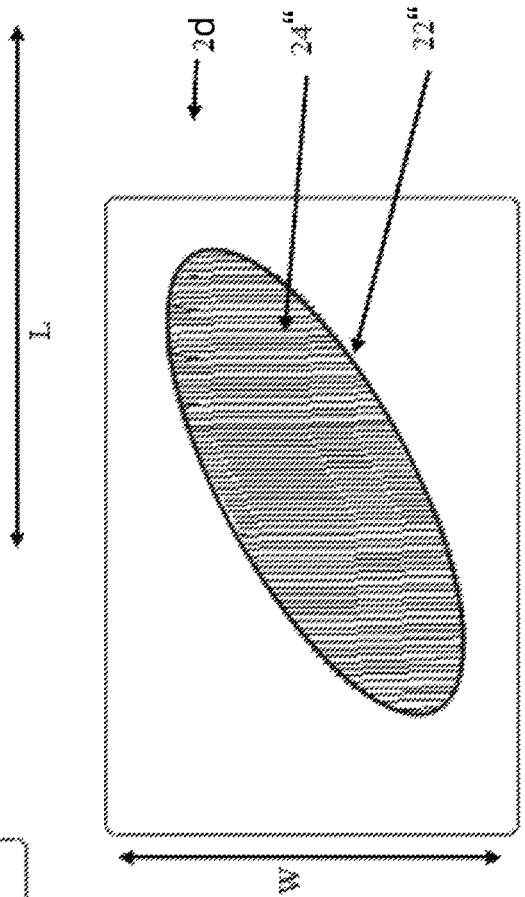

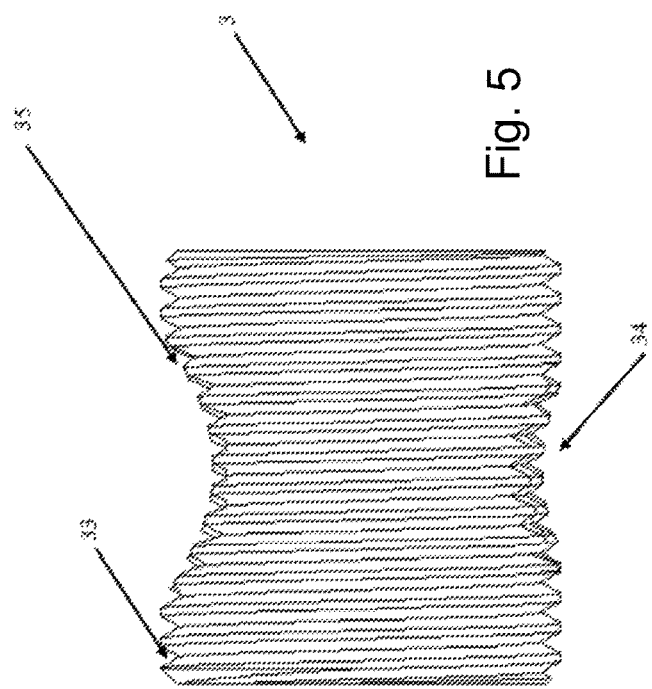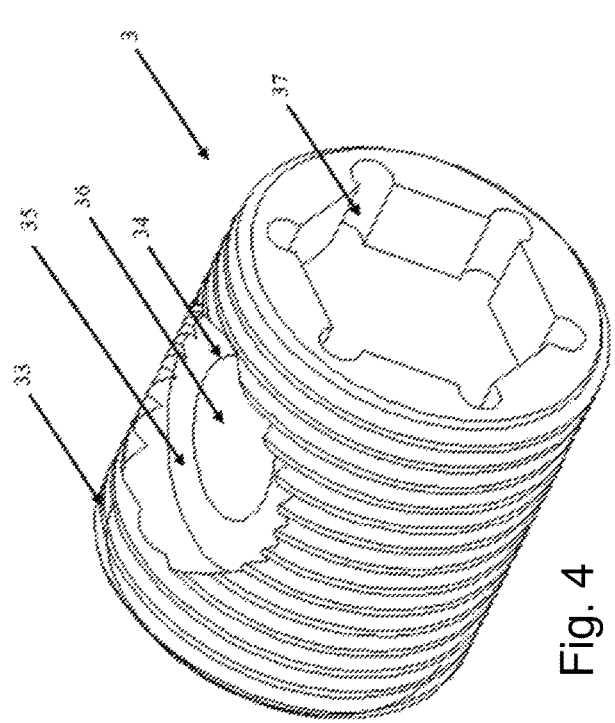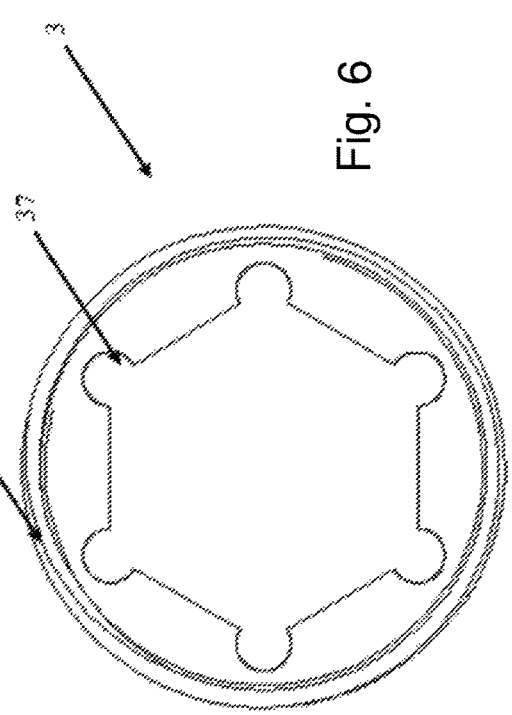

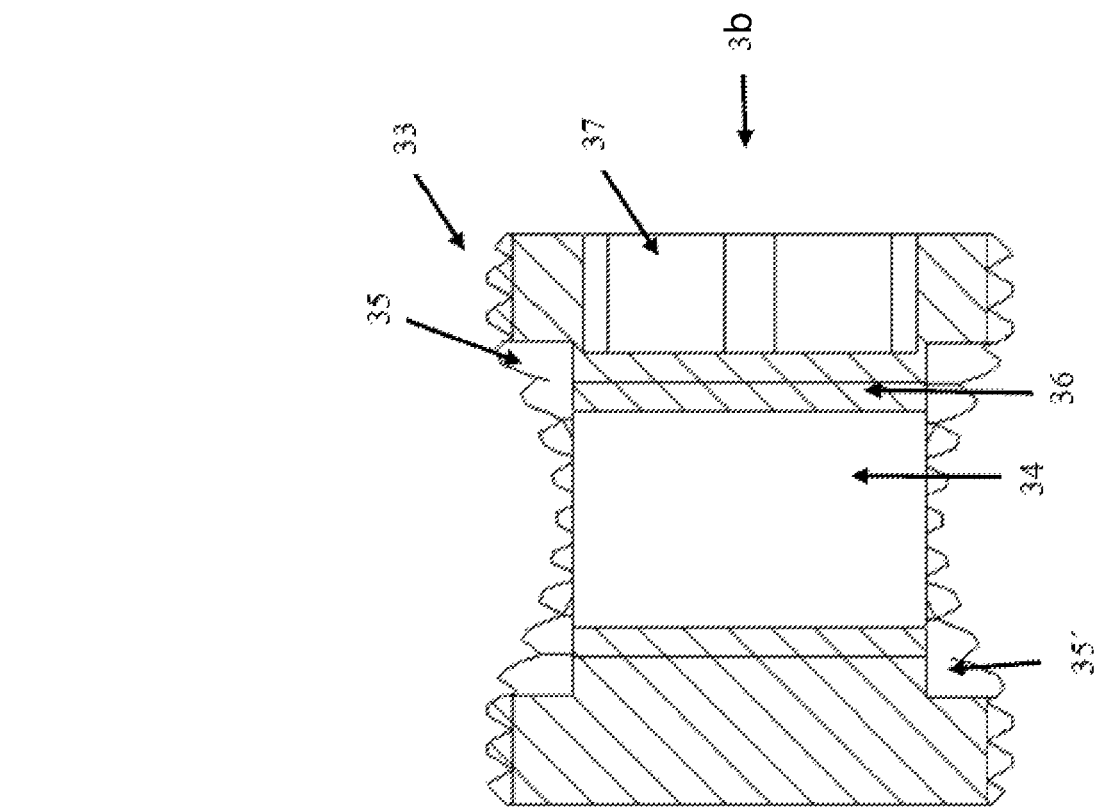
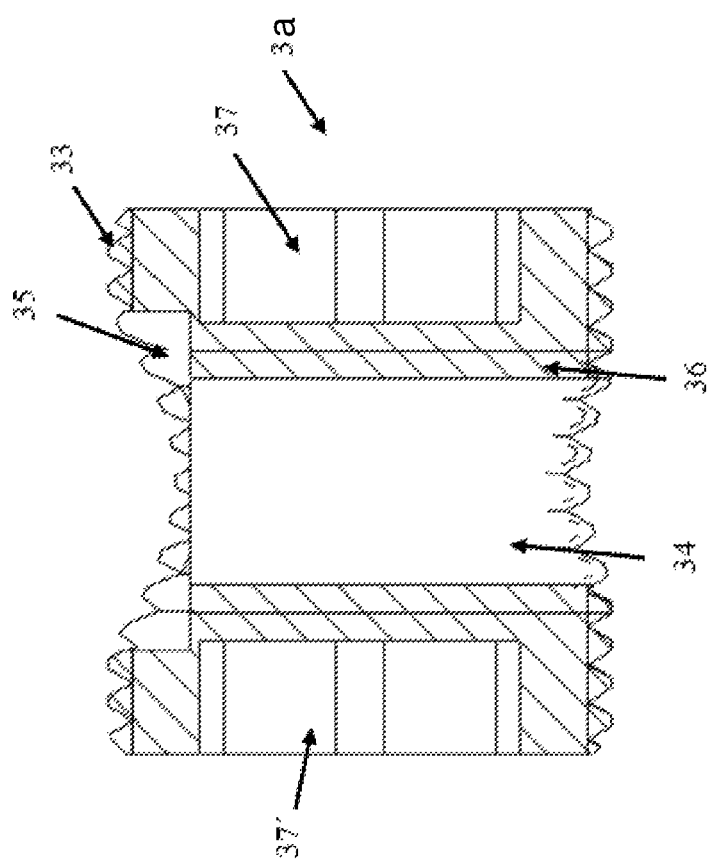
Fig. 8B
Fig. 8C

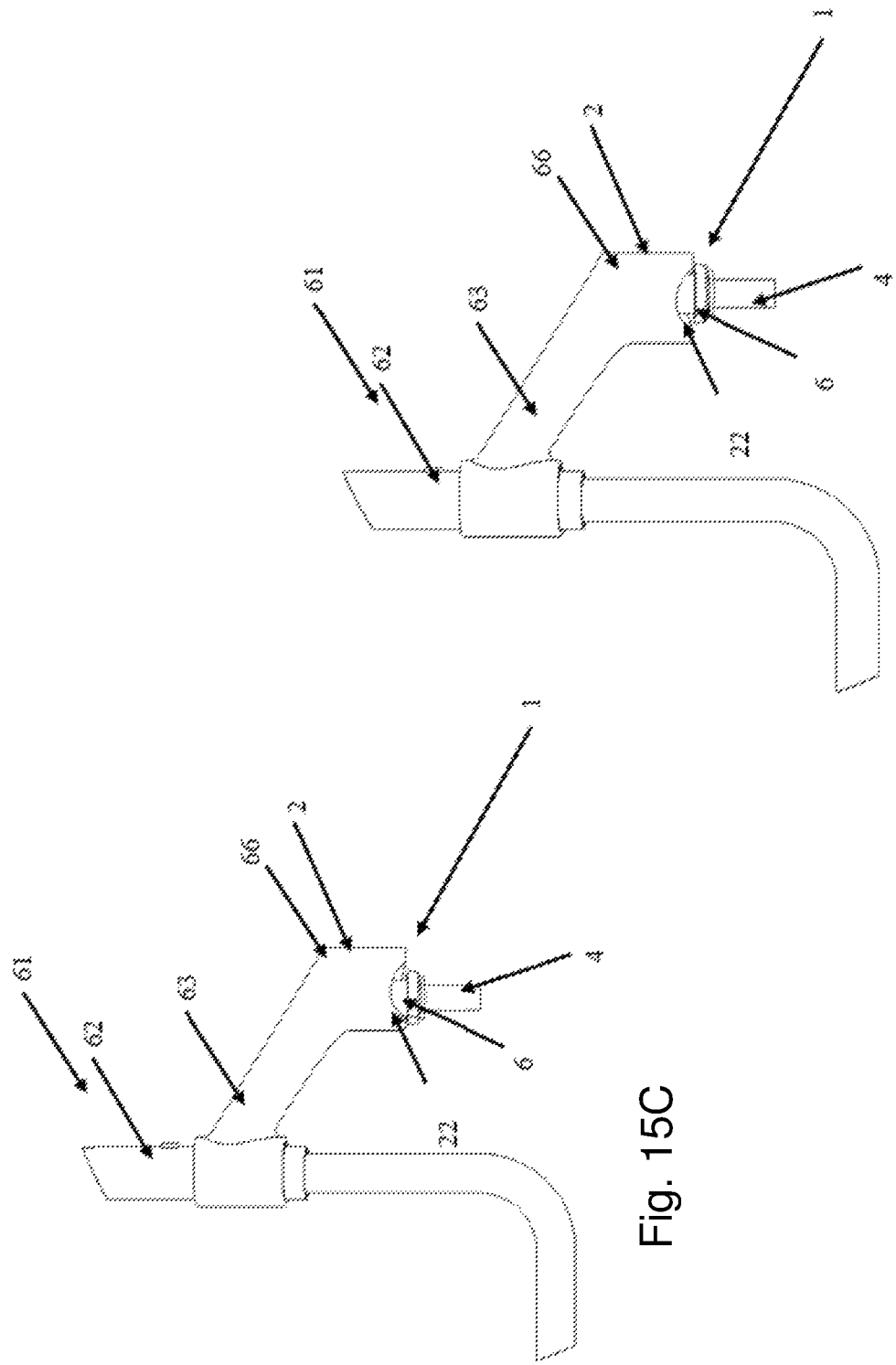

MOUNTING UNIT, CASTER WHEEL ASSEMBLY AND WHEELCHAIR

CROSS-REFERENCE TO RELATED APPLICATIONS

This application claims priority from German Patent Application No. 102018117476.4, filed on Jul. 19, 2018, the disclosure of which is incorporated herein by reference in its entirety.

BACKGROUND OF THE INVENTION

This invention relates in general to a mounting unit, especially a mounting unit for a wheelchair frame, a caster wheel assembly comprising such a mounting unit and a wheelchair with such a caster wheel assembly and/or such a mounting unit. In particular the invention relates to a mounting unit for adjustably mounting an add-on piece to a frame, in particular of a wheelchair.

Previously, either form-fitting elements such as gears or bolts in hole patterns were employed for highly loaded and angle-adjustable attachments or continuously adjustable cylindrical clamped connections for less demanding loads. Whereas clamped connections may lack resilience and durability, form fitting connections are often too heavy and bulky. When form-fitting connections and clamped connections are used together, the construction tends to be cumbersome and complicated, particularly in that the connections contain too many parts.

A quick release, detachable wheel hub assembly is known from US 2004/0017058 A1 for a light manual wheelchair. The wheelchair wheels are mounted on outer hubs and rotate with them. The inner surface of each of the outer hubs is matched to an opposite outer surface of the inner hubs. One of the opposing surfaces on the hubs has a projection or plurality of projections that fit tightly into corresponding openings on the opposing surface of the other hub when the opposing surfaces of the hubs are joined together. The inner hubs are mounted on removable axles and rotate, with the axles screwed into the wheelchair frame. A quick release, removable locking pin is inserted and locked through the center of the hubs and into the removable axle, locking and rotating the hubs together. The wheels are released by removing the locking pins and pulling the hubs apart.

JP H09-220 261 A1 refers to adjusting the angle of castors to a wheelchair frame. At the lower end of the frame there is an insertion hole, the cross-section of which is circular and a head tube upper part can be inserted and fixed by a first clamp. An almost cylindrical sleeve is arranged between the bearings and the fitting hole of the lower end of the head tube. The cross-section of the fitting hole is circular; the sleeve can be fitted and fixed by a second clamp, and the axial direction is such that it crosses the axial direction of the head tube upper part. On the inner circumferential side of the sleeve there is a mounting hole to which the bearings are attached, and the trailing shaft and axial direction by crossing the axial direction are formed coaxially with the outer circumferential surface of the sleeve.

A roller mounting assembly for mounting a running wheel to a wheelchair frame, according to U.S. Pat. No. 8,662,516 B1, comprises a mounting body defining a running portion to be mounted relative to the wheelchair frame and a rotatable body within the running portion supporting the running wheel thereon for rotation relative to the rotatable body about an upright trailing axis. The trailing axle is rotatably mounted together with the rotatable body relative to the mounting body. A locking element is slidable within a channel in the mounting body and includes teeth meshing with corresponding teeth on the rotatable body. One or more adjusting screws allow the locking element to be moved controllably between different locking positions within the channel in the longitudinal direction according to different angular orientations of the impeller axis.

DE 202 21 587 U1 relates to a mounting assembly comprising an elongate member in engagement with a receiving formation of a receiving member, wherein the elongate member has an outer cross-sectional shape which is non-circular and includes circumferentially spaced portions of a defining circle with remaining portions there between, the receiving formation having an internal cross-sectional shape cooperating with at least the remaining portions of the external cross-sectional shape of the elongate member to prevent relative movement between the receiving member and the elongate member about the longitudinal axis of the latter.

Therefore it would be desirable to provide mounting units that overcome the drawbacks of the prior art, especially to provide a highly resilient and loadable, compact, highly variable and adjustable, in particular continuously adjustable, mounting unit for add-on pieces provided with fewer parts.

SUMMARY OF THE INVENTION

This invention relates to a mounting unit, especially a mounting unit for a wheelchair frame, a caster wheel assembly comprising such a mounting unit and a wheelchair with such a caster wheel assembly and/or such a mounting unit. In particular the invention relates to a mounting unit for adjustably mounting an add-on piece to a frame, in particular of a wheelchair.

The mounting unit is provided with at least one drum receiving unit having at least one aperture and a female thread. The drum receiving unit is provided by the frame or adapted to be attached to the frame. The mounting unit further provides at least one drum assembly having at least one hole and a male thread, and at least one bolt, the bolt being provided by an add-on piece or adapted to cooperate with and to hold the add-on piece. The drum receiving unit is adapted to receive the drum assembly, the female thread is adapted to match with the male thread and to allow an alignment of the position of the hole with respect to the aperture, such that the bolt can be inserted through the aperture at least partly into the hole. The drum receiving unit with the drum assembly and/or the drum assembly with the bolt comprises a detachable form fit connection, and at least one of the drum receiving unit, the drum assembly and/or the bolt comprises a detachable force fit connection with another one of the drum receiving unit, the drum assembly and/or the bolt.

Further preferred embodiments are described in the following examples:

In a first example a mounting unit for adjustably mounting an add-on piece to a frame, in particular of a wheelchair, is characterized by at least one drum receiving unit having at least one aperture and a female thread, the drum receiving unit being provided by the frame or adapted to be attached to the frame. The mounting unit provides at least one drum assembly having at least one hole and a male thread, and at least one bolt, the bolt being provided by the add-on piece or adapted to cooperate with and to hold the add-on piece. The drum receiving unit is adapted to receive the drum assembly, the female thread is adapted to match with the male thread and to allow an alignment of the position of the hole with respect to the aperture, such that the bolt can be inserted through the aperture at least partly into the hole. The drum receiving unit with the drum assembly and/or the drum assembly with the bolt comprises a detachable form fit connection. At least one of the drum receiving unit, the drum assembly and/or the bolt comprises a detachable force fit connection with another one of the drum receiving unit, the drum assembly and/or the bolt.

In a second example, a mounting unit according to the example above is characterized in that the drum receiving unit comprises more than one aperture, in particular two opposing apertures, at least one slit and/or at least one socket.

In a third example, a mounting unit according to examples 1 or 2 is characterized in that at least one aperture of the drum receiving unit has an essentially circular, elongated, elliptical, spiral, half-circular, rectangular and/or polygonal shape.

In a fourth example, a mounting unit according to example 2 or 3 is characterized in that the socket is adapted to operate with fastening means for at least partly closing the slit to apply a force on the drum receiving unit, wherein preferably the slit comprises the aperture of the drum receiving unit through which the bolt can be inserted into the hole of the drum assembly, and preferably the aperture of the drum receiving unit induces a force fit and/or form fit connection at least in parts between the bolt and the drum receiving unit when the slit closes.

In a fifth example, a mounting unit according to any of the preceding examples is characterized in that the drum assembly comprises a male thread, one or more counterbores for cooperating with the bolt, more than one hole for cooperating with the bolt, a through hole angled relative to the hole(s), openings distributed across the threaded surface of the drum assembly for driving the drum assembly with a matching tool, at least one groove on an end face and/or at least one groove on a second end face.

In a sixth example, a mounting unit according to example 5 is characterized in that at least one hole comprises a female thread for cooperating with the bolt, and/or at least one groove comprises the form of a hexagon with circular shaped depressions on the six corners, a hex socket, a star socket, a hexa-lobular socket, a form used by screw drives and/or a protrusion, and/or at least one groove and/or opens/open the openings into the through hole.

In a seventh example, a mounting unit according to any of the preceding examples is characterized in that the drum assembly and/or the drum receiving unit comprises at least one marking for marking the alignment of the position and/or the angle of the drum assembly with respect to the drum receiving unit, in particular for marking the alignment of the hole(s) and/or the counterbore(s) to the aperture(s).

In an eighth example, a mounting unit according to any of the preceding examples is characterized in that the drum assembly comprises a drum, with in particular the drum being placed between two screws, preferably at least one of the end faces of the drum comprising a conical, a hemispherical, a cylindrical, a regular polygonal, a convex and/or a star shape and at least one of the screws has a corresponding receiving portion matching the shape of the at least one end face of the drum, and/or in particular the drum being rotationally symmetrical relative to an axis, preferably the through hole extending along the axis, and/or the hole(s) extending radially to the axis.

In a ninth example, a mounting unit according to example 8 is characterized in that the female thread comprises a first part being left-handedness and a second part being right-handedness, and one of the screws matches the handedness of the first part, whereas the other screw matches the handedness of the second part.

In a tenth example, a mounting unit according to any of the preceding examples is characterized in that at least one of the holes is located eccentrically on an end face of the drum assembly.

In an eleventh example, a mounting unit according to any of the preceding examples is characterized in that the bolt comprises a first bolt section having a first center line, a second bolt section having a second center line and a bolt meeting section, wherein the first bolt section is adapted to cooperate with the drum assembly, in particular cooperating with the female thread by having a male thread, and the second bolt section is adapted to cooperate with the add-on piece, in particular by comprising a male thread on the outer surface and/or a hole comprising a female thread.

In a twelfth example, a mounting unit according to example 11 is characterized in that the first center line and the second center line have a displacement and/or an angle, wherein preferably the angle is approximately 0°, 1°, 1.5°, 2°, in particular within the range of 0° to just before 180°.

In a thirteenth example, a mounting unit according to any of the preceding examples is characterized in that the bolt comprises at least one locking nut, wherein preferably the locking nut is located in the first bolt section and/or the locking nut is located in the second bolt section.

In a fourteenth example, a mounting unit according to any of the preceding examples is characterized in that the drum receiving unit, the drum assembly and/or the bolt is/are adapted to expand and/or shrink at least in parts and in at least one direction when a force is applied.

In a fifteenth example, a mounting unit according to any of the preceding examples is characterized in that the cross-section of each aperture of the drum receiving unit is larger than each hole of the drum assembly.

In a sixteenth example, a caster wheel assembly is comprising a caster wheel frame, a caster fork, a caster wheel attached to the caster fork and a mounting unit according to any of the preceding examples to mount the caster fork as an add-on piece to the caster wheel frame.

In a seventeenth example, a wheelchair has a frame, at least one add-on piece and at least one mounting unit according to any of the examples 1 to 15 for mounting the add-on piece to the frame.

In an eighteenth example, a wheelchair according to example 17 is characterized in that the add-on piece(s) comprises at least one of a caster fork, a wheel, like a drive wheel, a caster wheel and/or an obstacle climbing wheel, such as a curb climbing wheel, drive means, like a tractor unit for converting a manual wheelchair into an engine-driven wheelchair, an engine, a motor and/or a battery, rest means, like a headrest, a backrest, an armrest and/or a footrest, support means, like a tray, a platform, a holder and/or an arm, steering means, electronic means, control means, protection means, like a rain shelter, a sun shelter, a wind shelter, an umbrella, a sun umbrella and/or a cloth shield, a modular linking system, sensor means, like a sensor kit for assisted or autonomous driving, a rear view mirror and/or a camera, a tow hitch, a fork lift, a snow plough, a broom and/or a flame thrower, signal means, like a horn, interface means, like a display, a touchscreen, a control panel and microphone, and/or a loud speaker, light means, like a drive light, a brake light and/or a turn light, and/or a docking station.

In a nineteenth example, a wheelchair according to example 18 is characterized in that the tractor unit comprises at least one wheel, an electric motor, a battery and a control and steering device, in particular the tractor unit also comprises a sensor kit and/or a control unit for assisted or autonomous driving and/or lights.

By employing a detachable form fit and a detachable force fit connection at the same time, the mounting unit of the invention provides the benefit that either size and/or weight of the connection can be reduced while maintaining a higher resilience and loadability or the resilience and loadability of the connection can be increased while maintaining or reducing the size and/or weight of the connection. By properly designing the connection, the surface for the force fit connection is increased and instead of having a pure radial force, the force is split into a radial and an axial force. By employing several degrees of freedom, the position in different directions and/or different angles of add-on pieces can be adjusted in a favorable way, in particular in a continuous, step-less way.

Especially by using a mounting unit of the invention for mounting caster wheels to a wheelchair, multiple degrees of freedom for adjusting the properties of the caster wheel, for example the trail, the track, the position, the camber, the caster angle and/or the toe, are provided.

Adjusting the track of a wheelchair is an important factor when considering the stability of the wheelchair, especially when the user of a wheelchair moves and changes his weight distribution and in particular for wheelchairs designed for children. Adjusting the track of a wheelchair can also be important when moving past a bottleneck, a narrow path or within a crowded place.

During manufacturing, in particular during welding, small variations in the connections can lead to camber angles which differ from 90°, i. e. a caster wheel will have a camber which is not 0°. This can lead to an unfavorable driving behavior. In addition, there might be small variations causing the height of the frame to differ. This might lead to a lifted wheel, i. e. the wheel cannot touch the ground. All these drawbacks can be avoided by adjusting the caster wheel position when mounting the same with a mounting unit of the invention.

Various aspects of this invention will become apparent to those skilled in the art from the following detailed description of the preferred embodiment, when read in light of the accompanying drawings.

BRIEF DESCRIPTION OF THE DRAWINGS

FIG. 1A is a perspective, exploded view of a mounting unit, comprising a drum receiving unit, a drum assembly and a bolt in line with a first embodiment the invention.

FIG. 1B is an enlarged view of a threaded portion of the drum assembly of FIG. 1A.

FIGS. 2A-2B are perspective views of a drum receiving unit.

FIG. 3A is a bottom view of an embodiment of a drum receiving unit.

FIG. 3B is a bottom view of another embodiment of a drum receiving unit.

FIG. 3C is a bottom view of yet another embodiment of a drum receiving unit.

FIG. 4 is a perspective view of a drum assembly.

FIG. 5 is a side view of the drum assembly of FIG. 4.

FIG. 6 is a front view of the drum assembly of FIG. 4.

FIG. 8B is a cross sectional view of a drum assembly similar to the drum assembly of FIG. 8A according to a further embodiment of the invention.

FIG. 8C is a cross sectional view of a drum assembly similar to the drum assembly of FIG. 8A according to another further embodiment of the invention.

FIG. 15C is an elevational view of the wheelchair caster arm and mounting unit of FIG. 15A.

FIG. 15D is an elevational view of the wheelchair caster arm and mounting unit of FIG. 15B.

DETAILED DESCRIPTION OF THE PREFERRED EMBODIMENT

Figure 7:
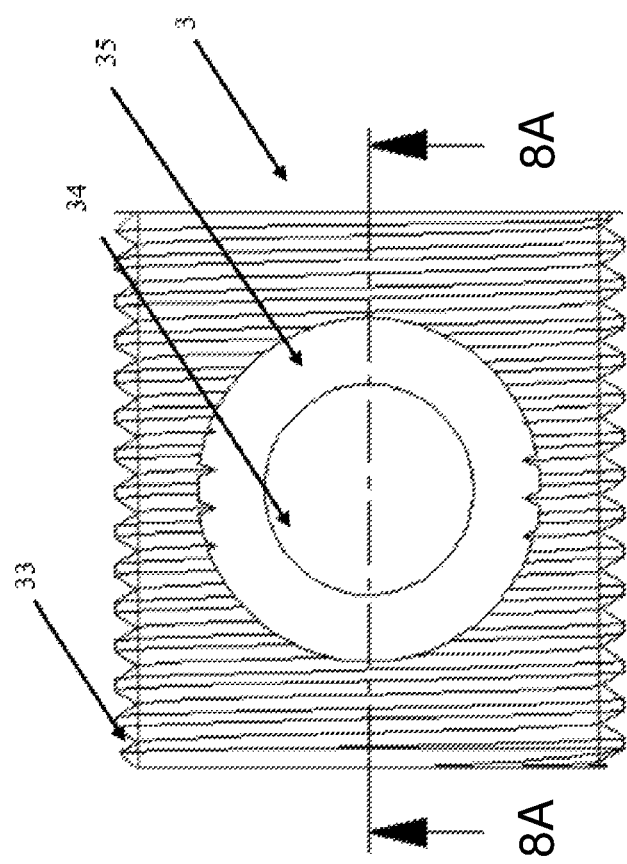
FIG. 7 is a bottom view of the drum assembly of FIG. 4.

Referring now to the drawings, there is illustrated in FIG. 1A a basic design of a mounting unit 1 according to a first embodiment of the invention and comprises a first embodiment of a drum receiving unit 2, a first embodiment of a drum assembly 3 and a first embodiment of a bolt 4. The drum receiving unit 2 comprises an aperture 22 and a female thread 24. The drum assembly 3 comprises a male thread 33, matching the female thread 24 of the drum receiving unit 2, and a hole 34. The drum receiving unit 2 and the drum assembly 3 are configured to allow the drum assembly 3 to be at least partially inserted into and secured with the drum receiving unit 2 in a form fitting manner via the male and female threads 24, 33. The hole 34 is configured to allow the bolt 4 to be at least partially inserted into and secured with the drum assembly 2, preferably also via matching male and female threads (not shown). It is preferred that the drum assembly 3 is fully inserted into the drum receiving unit 2 and also stays completely inside the drum receiving unit 2 when the position of the hole 34 is adjusted. The aperture 22 is configured to allow the bolt 4 to be inserted into the drum assembly 3 after the drum assembly 3 has been inserted into the drum receiving unit 2. In order to also receive a force fit connection between i.) the drum receiving unit 2 and the drum assembly 3, ii.) the drum assembly 3 and the bolt 4 and/or iii.) the drum receiving unit 2 and the bolt 4; the drum receiving unit 2, the drum assembly 3 and/or the bolt 4 can be configured to expand and/or shrink at least in parts and in at least one direction when a force is applied to implement a force fit connection. This can be realized, for example, by employing a slit; but a person skilled in the art will also know and employ other methods and possibilities to realize a force fit connection, for example employing a spring.

The mounting unit 1 of the invention provide a high degree of flexibility in conjunction with the first embodiment and other embodiments of the invention, in particular as follows:

By varying the screw penetration depth of the drum assembly 3 inside the drum receiving unit 2 the position of an add-on piece connected to the bolt 4 within the boundaries of the aperture 22 can be adjusted.

By varying the screw penetration depth of the bolt 4 inside the drum assembly 3 the distance of an add-on piece with respect to the drum receiving unit 2 can be adjusted.

By having a specifically designed bolt 4, in particular by an angled bolt, the angle, position and/or orientation of an add-on piece can be adjusted during a 360° rotation of the bolt 4.

In the following different embodiments of the drum receiving unit 2, 2a, 2b, 2c, and 2d; the drum assembly 3, 3a, 3b, 3c, and 3d; and the bolt 4, 4a, and 4b are described individually. It is to be understood that they all may be used in various combinations with each other to form the different embodiments of the mounting unit 1 of the invention and achieve a mounting unit 1 with the favorable qualities of the invention.

Figure 16:
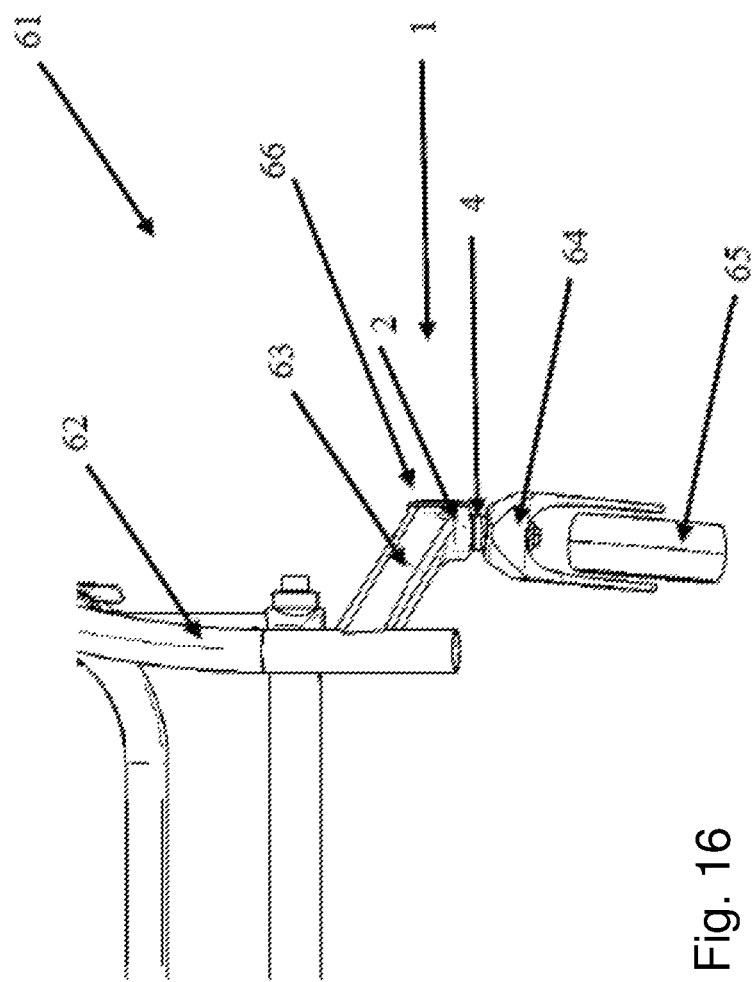
FIG. 16 is an elevational view of another embodiment of a wheelchair caster arm and mounting unit in accordance with the invention.

The drum receiving unit 2 can be formed as a part of a frame or attached to a frame, such as frame 62 of FIG. 16. The frame will be often made from essentially hollow tubes, whose outer and/or inner shape may not necessarily be round. The drum assembly 3 can be inserted before the different parts of the frame are permanently connected, for example by welding. The frame can be constructed in such a manner that at least a part of the frame can be disconnected or the drum receiving unit 2 can be located at an end of a frame part. In the last two cases, the drum assembly 3 can be inserted afterwards. When formed as a part of a frame, the drum assembly 3 is allowed to be rotated within the drum receiving unit 2 to adjust its position. As shown in FIG. 1B, one possibility for this would be to distribute small holes 25 in the valley between two crests of the thread across the surface of the drum assembly 3. This allows the insertion of a lever or a similar tool through the aperture 22 of the drum receiving unit 2 into the holes and by using this lever to effect the rotation of the drum assembly 3. If the pitch of the thread is too small to place suitable holes between them, the holes 25' could also extend across more than one ridge. A person skilled in the art will know other methods and possibilities to realize the position adjustment of the drum assembly 3 and the various derivative embodiments when placed inside the frame.

A second embodiment of a drum receiving unit 2a is shown in FIG. 2a. Here the drum receiving unit 2a comprises, in addition to the aperture 22 and the female thread 24, a slit 23 and a socket 26. The socket 26 comprises a first connection portion 28 and opposing the first connection portion 28, on the other side of the slit 23, a corresponding second connection portion (not shown). The corresponding connection portions 28 of the socket 26 are configured to be brought in operative connection with a fastening means 27 such as a screw or a strap. The fastening means 27 can be used to reduce and/or close the slit 23 and realize a force fitting connection, especially between the drum receiving unit 2a and the drum assembly 3. In another embodiment shown in FIG. 2B, a drum receiving unit 2b, similar to the drum receiving unit 2a, comprises more than one socket 26 for closing the slit. This ensures that enough force can be applied and that the force can be distributed equally and/or specifically at certain points along the drum receiving unit 2b. As shown in FIG. 2B, the drum receiving unit 2b comprises two sockets 26, 26' and two fastening means 27, 27'. Alternatively or additionally the drum receiving unit 2a or 2b can also have more than one slit 23. By closing the slit, the surface pressure increases and the connection becomes more resilient and loadable, especially when taking into account the threaded surface in opposition to a smooth surface.

FIGS. 3A to 3C show bottom views of the drum receiving units 2b and 2c, depicted in FIGS. 2B and 2C, respectively, and a drum receiving unit 2d having a third additional fastening means. Here, embodiments of the aperture 22 and alternative aperture configurations 22' and 22" are visible. In general the aperture 22 is adapted to allow the hole 34 of the drum assembly 3 to be positioned at different positions across the aperture 22, such that the position and/or angle of the bolt 4 can be varied depending on design and requirements of the actual implementation. In FIG. 3A, the aperture 22 has an essentially circular shape, whereas in FIG. 3B the aperture 22' has a shape which is elongated along one direction of the drum receiving unit 2c and defining a length, L. In FIG. 3C, an elliptical shape for the aperture 22" is chosen, which is rotated such that the possible positions of the bolt 4 along the length L of the drum receiving unit 2d are essentially correlated to the positions along a width W of the drum receiving unit 2d. Other forms and shapes of the aperture 22 are also within the scope of the invention. For example, an aperture having an at least partly spiral shape, a half-circular shape, a rectangular shape, a polygonal shape and other suitable forms are contemplated.

Additionally or alternatively the drum receiving unit, such as drum receiving unit 2, can have more than one aperture 22 for allowing the bolt 4 to be inserted in different configurations, for example in different angles, and/or at different positions. The drum receiving unit 2 can also have two opposing apertures 22 (the second opposing aperture not shown), also allowing the bolt 4 to pass through the drum assembly 3 by entering first through one aperture 22 and leaving through another aperture 22. Similarly, the other embodiments of drum apertures may be provided in opposite positions of other drum receiving unit embodiments. The drum assembly 3 can have one or more corresponding holes 34, 34', such as shown in FIG. 8D and/or more than one drum assemblies 3 can be provided.

In a further embodiment, not depicted, at least one aperture 22 is integrated into at least one of the slits 23. Therefore when closing the slit 23 the aperture 22 can induce, at least in part, a force fit and/or form fit connection with the bolt 4, especially with a locking nut comprised by the bolt 4. By specifically designing the aperture 22 and the bolt 4, the form fit connection can be realized. For this, the bolt 4 can have a surface and/or at least one recess, preferably a series of recesses, with which the closing aperture 22 engages when the slit 23 closes.

FIGS. 4 to 8A show different views of a drum assembly 3 according to a second embodiment. In FIG. 4, a perspective view of the drum assembly 3 is shown. The drum assembly 3 has a cylindrical shape and comprises a male thread 33 around its lateral surface, the surface area of its circumference.

Perpendicular to the cylinder axis and in the central area between the two end faces the drum assembly 3 comprises a hole 34 and a counterbore 35 for receiving and therefore cooperating with bolt 4, especially with the locking nut comprised by the bolt 4. The inner surface of the hole 34 comprises a female thread 36 matching a male thread of the bolt 4, such that the hole 34 can cooperate with the bolt 4. On at least one end face the drum assembly 3 a groove 37 is provided for receiving a mating part of a tool (not shown) for driving the drum assembly 3 within the drum receiving unit 2. In this embodiment, the groove 37 comprises the form of a hexagon with circular shaped depressions on the six corners. Alternatively, a hex socket, a star socket, a hexa-lobular socket or other forms of tool access point, such as those known from screw drives may also be used.

FIG. 5 shows a side view of the drum assembly 3 with the male thread 33, and the cut-outs for the hole 34 on one side and for the counterbore 35 on the opposing side.

FIG. 6 shows an end view of drum assembly 3 showing the male thread 33 and the groove 37 for receiving the driving tool.

FIG. 7 shows a bottom view of the drum assembly 3, in which the hole 34, the counterbore 35, and the cutting line A are depicted. FIGS. 8A to 8D are sectional views along the cutting line A of FIG. 7 of different embodiments of the drum assembly 3, 3a, 3b, and 3c.

Figure 8A:
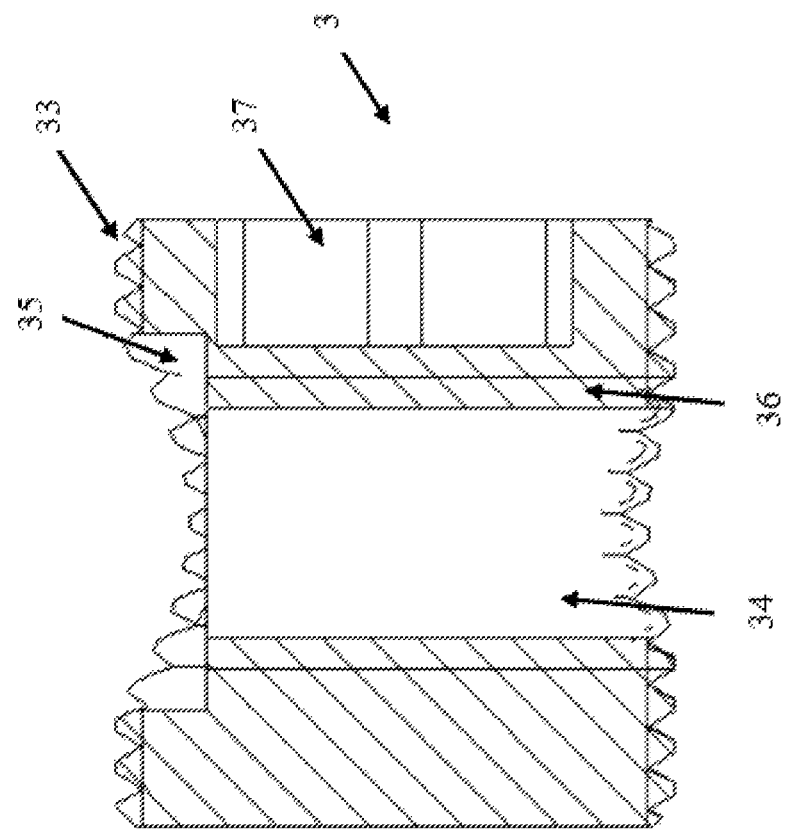
FIG. 8A is a cross sectional view of the drum assembly of FIG. 7.
Figure 8D:
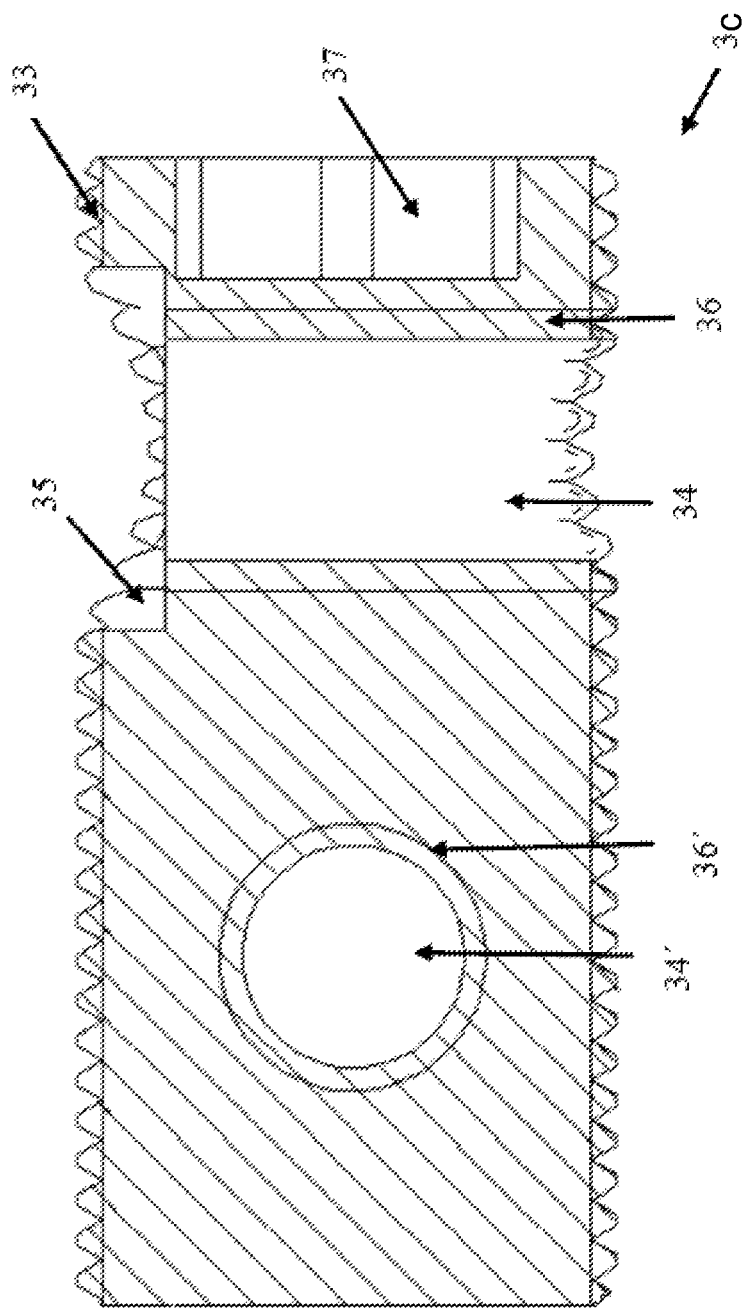
FIG. 8D is a cross sectional view of a drum assembly similar to the drum assembly of FIG. 8A according to yet another further embodiment of the invention.

The drum assembly 3 of FIG. 8a has a single counterbore 35 on the bottom, a hole 34, a female thread 36 and a groove 37 as described above.

Alternatively or additionally, the drum assembly 3a comprises a second groove 37' on the opposing end face, as shown as a third embodiment of a drum assembly in FIG. 8B. This allows the drum assembly 3a to be driven with a tool from both sides. Alternatively or additionally, as shown in FIG. 8C, a drum assembly 3b of a fourth embodiment comprises a second counterbore 35' at the periphery of the end of hole 34 opposing the first counterbore 35. This allows the bolt 4 and/or the locking nut (such as locking nut 6 in FIGS. 15A-15D) to be inserted from both ends of hole 34, such that the drum assembly 3b can be used either when the counterbore 35 or the counterbore 35' is facing the aperture 22. In this way, for example, a halved step size for the bolt position adjustment or the usage of a larger thread size while maintaining the same step size can be realized.

In FIG. 8D, a drum assembly 3c of a fifth embodiment is shown. The drum assembly 3c has here a larger size along the cylinder axis to provide more than one hole 34, in particular a separate second hole 34' also having a female thread 36'. Here the hole 34' is rotated with respect to hole 34 by 90°, however, any other angle is also possible. Having a separate second hole allows either the usage of a second bolt 4, inserted at a different position and/or angle, or varying the position and/or angle of a single bolt 4. In another not shown embodiment, the second hole 34' has an angle of 90° with respect to and has at least partly an overlap with the first hole 34. Therefore the step size for the bolt position adjustment can be partly reduced. When using an embodiment having two holes with two counterbores each, the step size for the adjustment of the bolt 4 can be made to equal approximately a quarter turn of the drum assembly 3.

The individual features of these four embodiments of FIGS. 8A-8D can be used alone or in combination with one another, for example in a drum assembly having two counterbores 35, 35' and two grooves 37, 37' as shown in a combination of the drums 3a and 3b of FIGS. 8B and 8C.

Different variants of the individual features of the different parts are possible. As an example, the depth of the hole 34 may be shorter than the diameter of the drum assembly 3 or leading the whole way through the drum assembly 3 for allowing the bolt 4 to pass through the drum assembly 3. Alternatively or additionally, the groove 37 may at least in part be formed as a protrusion for allowing a tool to engage with the drum assembly 3.

Figure 9:
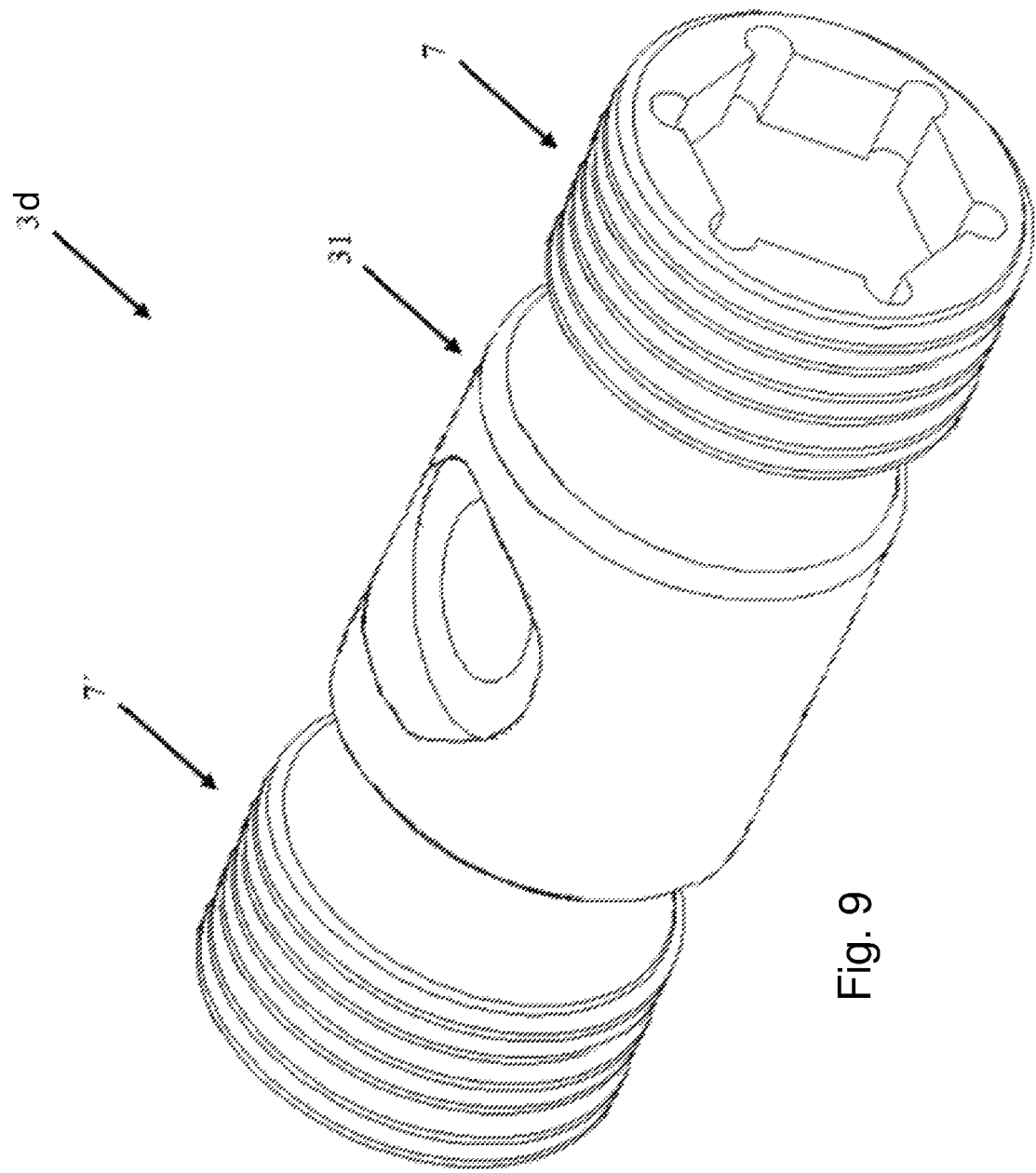
FIG. 9 is a perspective view of a drum assembly according to a still further embodiment of the invention.

A sixth embodiment of a drum assembly 3d is shown in a perspective view in FIG. 9. Here the drum assembly 3d comprises a drum 31 which does not comprise a male thread around its outer surface. Instead the drum assembly 3 comprises two screws, in particular two set screws 7, 7', between which the drum 31 is placed. The set screws 7, 7' are used to fix the position and/or angle of the drum 31 in the drum receiving unit 2. By loosening one of the set screws 7, 7' and tightening the other one of the set screws 7, 7' afterwards, the position and/or angle of the drum 31 can be continuously adjusted, i. e., without steps. In this embodiment, the drum 31 has a similar cylindrical shape and flat end faces. To increase the contact surface between drum 31 and set screws 7, 7', different shapes for the ends comprising the end faces of the drum 31 can be adopted. At least one of the set screws 7, 7' then has a corresponding receiving portion to contact the at least one end face of drum 31 and hold the drum 31 in place. As an example, a conical shape, a cylindrical and/or a hemispheric shape can be employed. Another possibility is to provide at least one of the ends of drum 31 with a regular polygon shape, for example a convex or star profile having a multiple of sides. This allows a stepwise adjustment of the drum within the corresponding receiving portion of the set screw.

It is also contemplated that the drum 31 does not need to have a cylindrical shape, but can also have a different shape, for example a rectangular shape, a ball shape or a bent or curved shape.

The male and female threads employed in this invention will typically be right-handed threads, but can also be left-handed threads. Additionally or alternatively, the female thread 24 of the drum receiving unit 2 can be subdivided. One part of the drum receiving unit 2 can comprise a right-handed female thread, whereas the other part can comprise a left-handed female thread. The two set screws 7, 7' would then have a male thread matching the handedness of the respective parts in which they are employed.

Figure 10B:
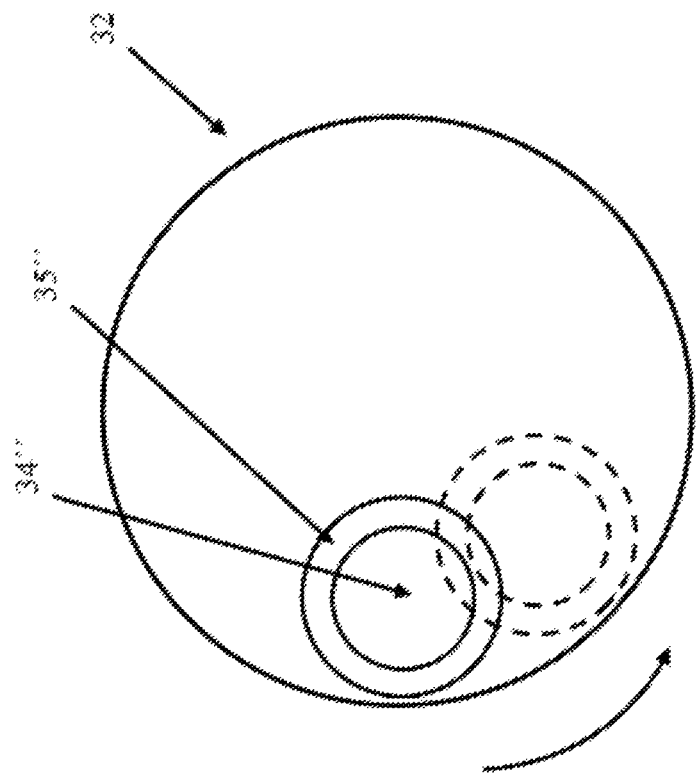
FIG. 10B is a schematic cross sectional view of the drum assembly of FIG. 10A showing repositioning of the locking nut feature.
Figure 10A:
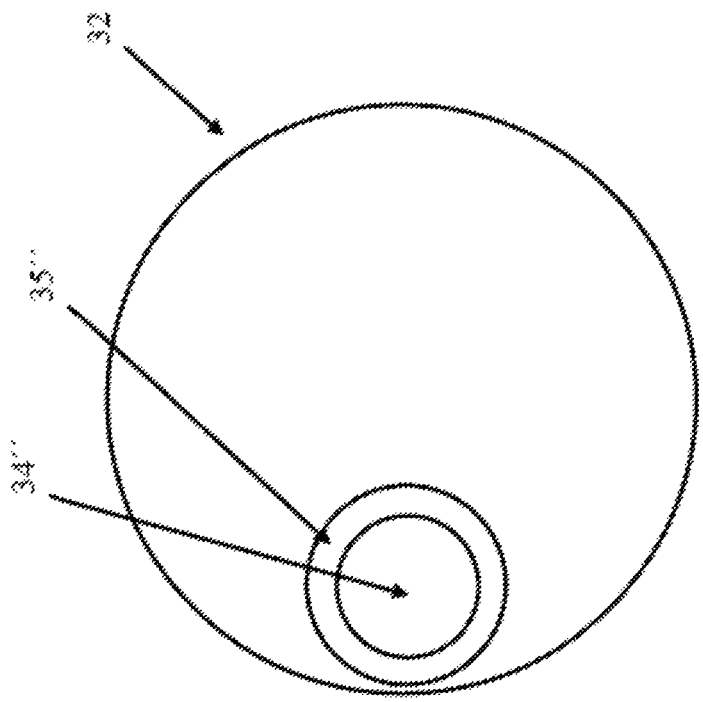
FIG. 10A is a schematic cross sectional view of a drum assembly according to another embodiment of the invention.

A seventh embodiment of a drum assembly according to the invention is shown in FIGS. 10A and 10B. As shown in the end view of FIG. 10A, the drum assembly 32 has the form of a cylinder, but the hole 34" and the counterbore 35" for the bolt 4 and/or the locking nut are located eccentrically in an end face of the drum assembly 32 instead of the lateral side. Therefore by rotating around the cylinder axis, the bolt 4 can be displaced, as shown in FIG. 10b. Such a drum assembly 32 might use the securing methods of the drum 31 of the sixth embodiment described above, but can also be secured using, for example, a drum receiving unit 2 and a male thread as drum assembly 3 from the first embodiment. It is also possible to provide the drum assembly 32 with more than one hole 34" and/or more than one counterbore 35" to increase the flexibility of such a system.

As an additional feature which can be employed in all of the embodiments of a drum assembly, the drum assemblies 3-3d, 32, in particular the drum 31, can be able to expand and/or shrink in at least one direction when a force is applied to implement a force fitting connection, for example by having at least one slit. Depending on the location and the direction of the slits, different functions can be realized. For example, when screwing bolt 4 (or other embodiments of the bolt, such as bolt 4a, 4b or any variation) into the drum assembly 3-3d, 32, the drum assembly 3-3d, 32 can expand and become clamped within the drum receiving unit 2 and/or the drum 31 can expand and become clamped within the drum assembly 3-3d, 32. In another example, the bolt 4 becomes clamped by the drum assembly 3-3d, 32, in particular the drum 31, when the drum receiving unit 2 is closed. Therefore, part of the force applied by the drum receiving unit 2 on the drum assembly 3-3d, 32 can be transferred to the bolt 4, leading to a tighter connection between the drum receiving unit 2, the drum assembly 3 and the bolt 4. Additionally or alternatively, the bolt 4 is adapted to cause the drum receiving unit 2 to shrink and also clamp the drum assembly 3-3d, 32, in particular when the bolt 4 is inserted into the drum assembly 3-3d, 32 and the bolt meeting section 46 and/or the locking nut of the bolt pushes against the drum receiving unit 2. Additionally or alternatively, when the bolt 4 passes through the drum assembly 3-3d, 32 and on the opposite side of the aperture 22 is no other aperture, the bolt 4 can apply a force on the drum receiving unit 2, leading to a force, preferably a force fit connection, between the drum receiving unit 2 and the drum assembly 3-3d, 32.

Figure 11:
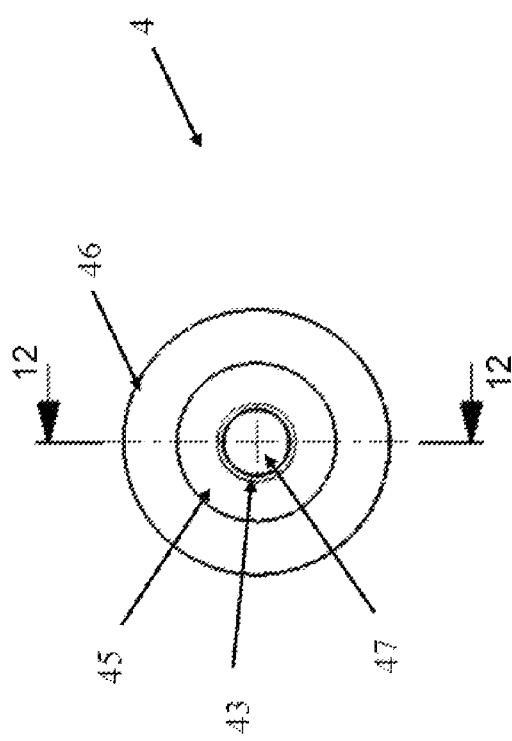
FIG. 11 is an end view of a bolt in accordance with the invention.
Figure 12:
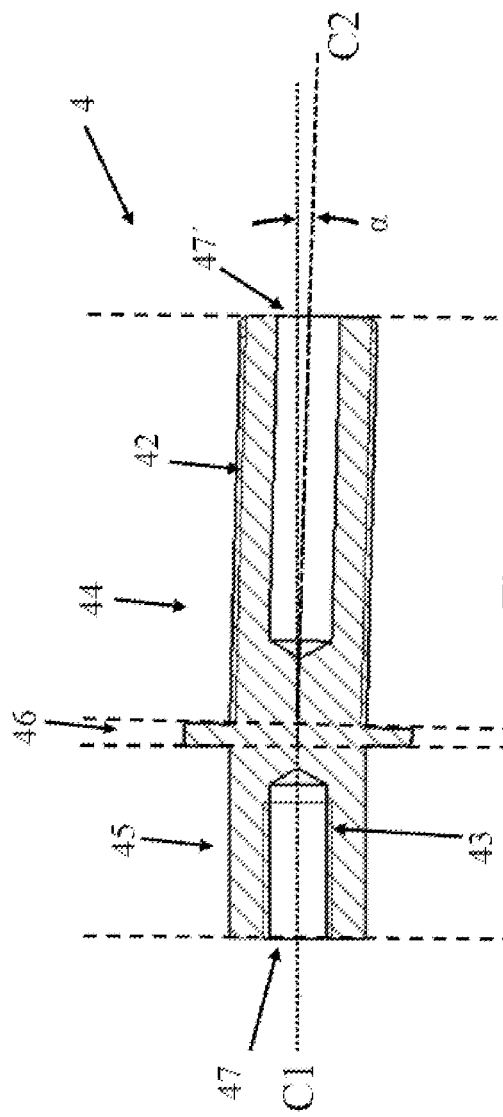
FIG. 12 is a cross sectional side view of the bolt of FIG. 11.

FIG. 11 shows a detailed end view of the bolt 4 and FIG. 12 is a sectional view along section line 12-12. The bolt 4 comprises three sections, a first bolt section 44, a second bolt section 45, and a bolt meeting section 46. The first bolt section 44 has essentially a cylindrical shape and comprises a male thread 42, a hole 47' and a center line C2. The center line C2 is the rotation axis, cylinder axis and/or symmetry axis for the first bolt section 44. The male thread 42 is adapted to put the bolt 4 in operative connection with a corresponding receiving portion, for example a corresponding receiving portion of the drum assembly 3, in particular the female thread 36. The hole 47' could be also equipped with a thread and then be brought into operative connection with a screw or similar fastening means. The second bolt section 45 has essentially a cylindrical shape and comprises a center line C1 and is adapted to be put in operative connection with, to cooperate with and/or to hold an add-on piece, in particular an add-on piece having a corresponding mating portion. Preferably the second bolt section comprises a hole 47. The hole 47 comprises a female thread 43 and/or a male thread on the outer surface of the second bolt section 45 is provided, which can be used to cooperate with the add-on piece. The center line C1 is the rotation axis, cylinder axis and/or symmetry axis for the second bolt section 45. The bolt meeting section 46 connects the first bolt section 44 and the second bolt section 45. The bolt meeting section 46 is illustrated having a larger diameter than the first bolt section 44 and the second bolt section 45. Therefore, it can limit the movement and block the position of the bolt 4 and/or of a locking nut (not shown). Alternatively or additionally, the bolt meeting section 46 can put a force on the drum receiving unit 2 and/or the drum assembly 3. Alternatively or additionally, the bolt meeting section 46 has a smaller diameter or substantially the same diameter as the first bolt section 44 and/or the second bolt section 45 and/or the first bolt section 44 has a smaller or larger diameter than the second bolt section 45.

The bolt 4 can also comprise at least one locking nut in the first bolt section 44 and/or the second bolt section 45 for locking the bolt 4, in particular for resisting loosening under vibrations and/or torque.

An angle α is formed between the center line C1 and the center line C2. An angle α of 0° corresponds to a straight configuration where center line C1 and center line C2 are co-linear. When the angle α deviates from 0°, an angled bolt is formed. Preferably, the angle α is greater than 0°, in particular between 0° and 90°. Depending on the design of the frame, the bolt and the add-on piece, the angle α can also be within a range of 0° to less than 180° such that an add-on piece can be inserted, preferably without touching the frame. A rotation of the first bolt section 44 around center line C2 then leads to a displacement of the second bolt section 45 and vice versa. In this way the angle, position and/or orientation of an add-on piece can be adjusted.

Figure 13:
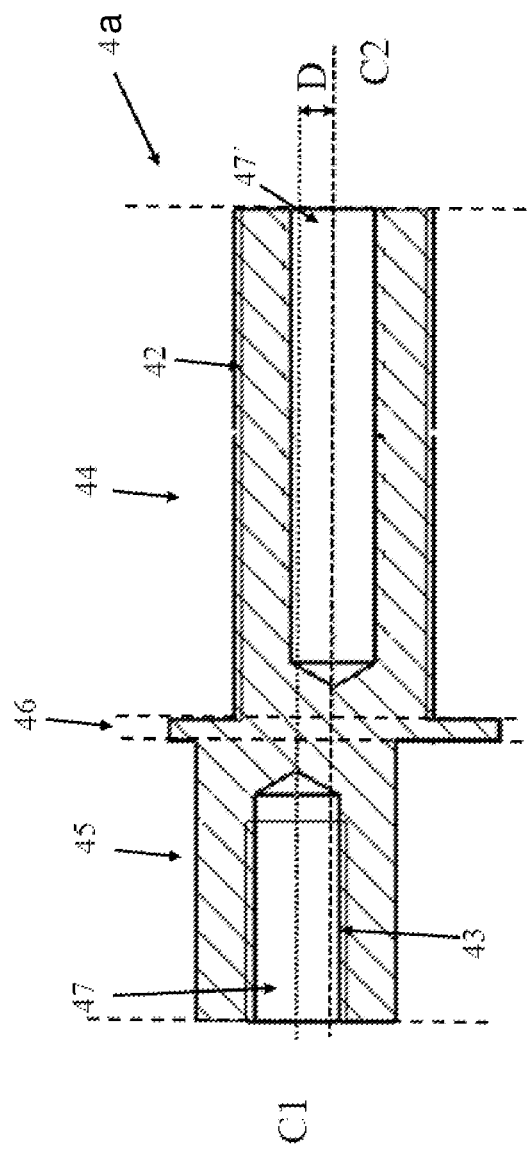
FIG. 13 is an alternative embodiment of a bolt in accordance with the invention.

In a second embodiment of a bolt 4a, as shown in FIG. 13, the center lines C1 and C2 of the first and second bolt sections 44, 45 have a displacement D. A rotation of the first bolt section 44 around center line C2 then leads to a displacement of the second bolt section 45 and vice versa. In this way the angle, position and/or orientation of an add-on piece can be adjusted.

Figure 14:
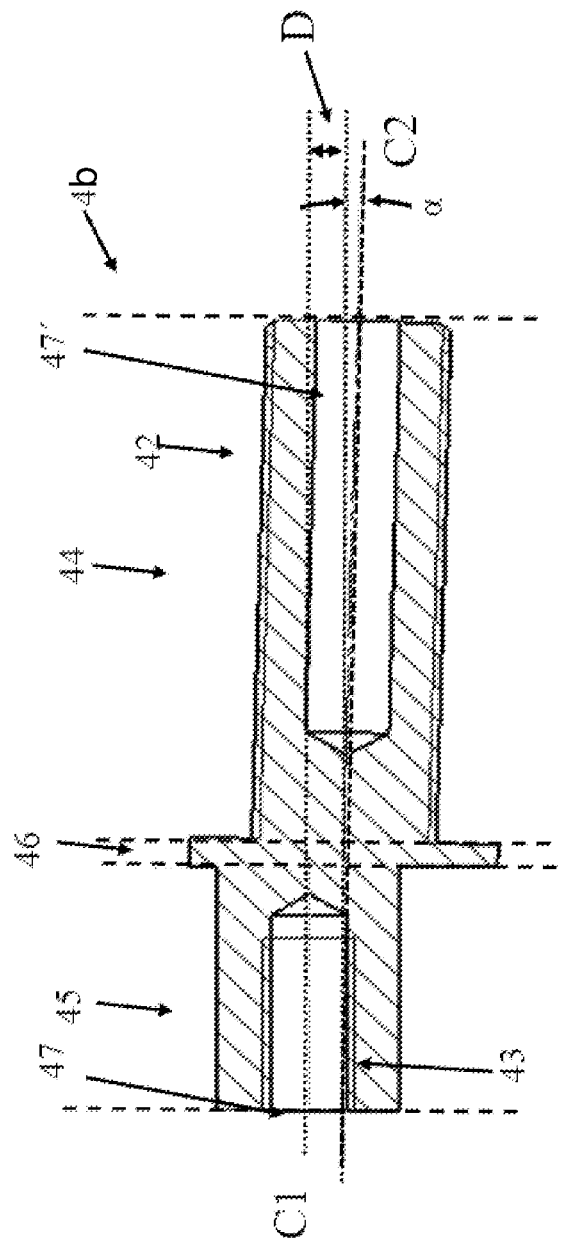
FIG. 14 is another embodiment of a bolt in accordance with the invention.

In a third embodiment of a bolt 4b shown in FIG. 14, the center lines C1 and C2 of the first and second bolt sections 44, 45 have a displacement D and an angle α larger than 0°. A rotation of the first bolt section 44 around center line C2 then leads to a displacement of the second bolt section 45 and vice versa. In this way the angle, position and/or orientation of an add-on piece can be adjusted.

The first and/or second embodiment of the drum receiving unit 2 and its variants can be combined with the various embodiment of the drum assembly 3 and its variants and the first, second, and/or third embodiment of the bolt 4 and its variants to form different embodiments of the mounting unit of the invention.

Figure 15B:
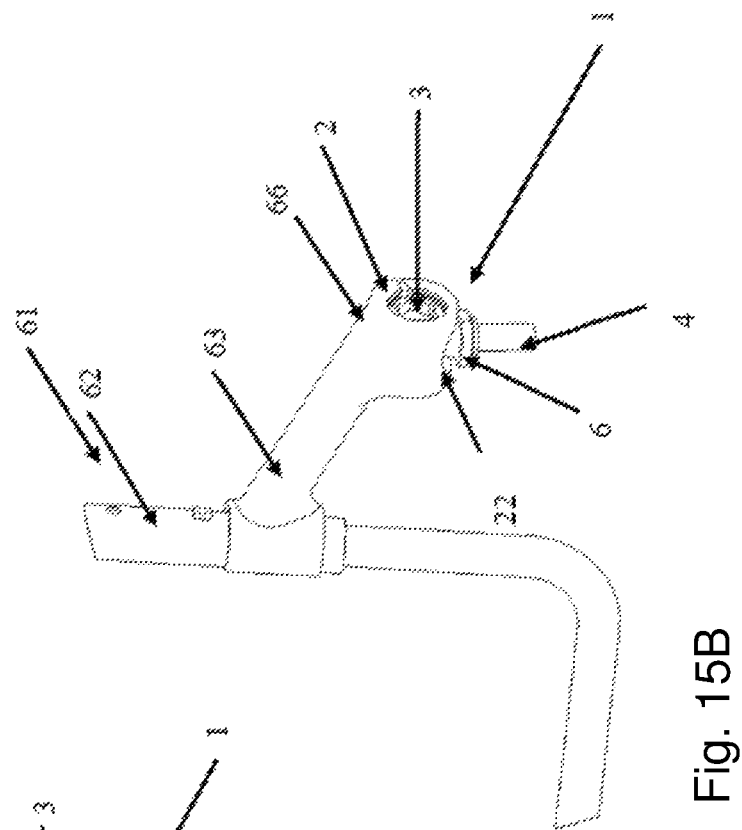
FIG. 15B is a perspective view of the wheelchair caster arm and mounting unit of FIG. 15A adjusted to a second adjustment setting.
Figure 15A:
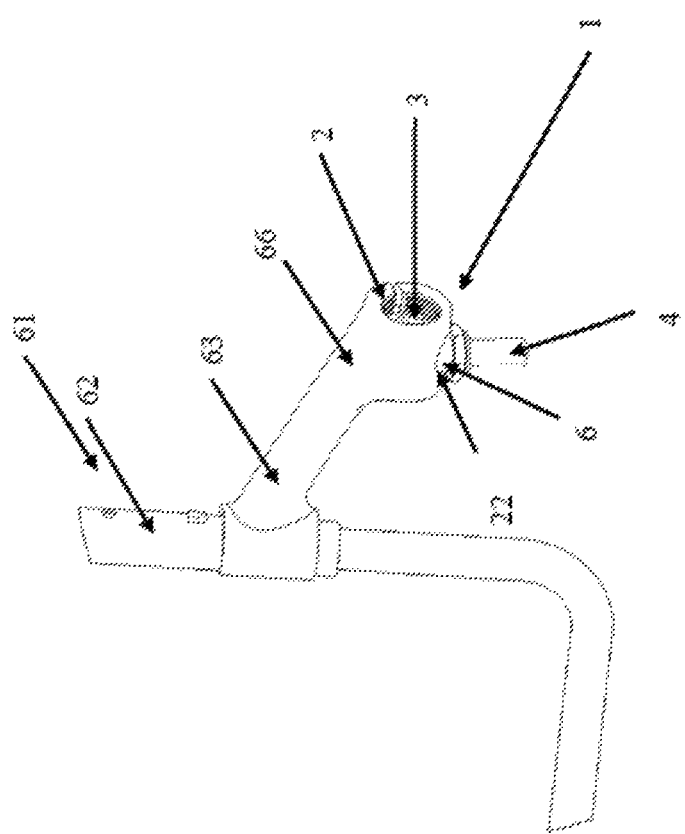
FIG. 15A is a perspective view of a wheelchair caster arm having a mounting unit in accordance with the invention and adjusted to a first adjustment setting.

An example of the mounting unit 1 according to the invention for adjusting the track of a caster wheel of a wheelchair 61 is shown in FIGS. 15A to 15D. FIGS. 15A and 15B each shows a perspective view of two different settings of the drum assembly 3, and FIGS. 15C and 15D each shows a front view for the same settings. The caster wheel assembly comprises the mounting unit 1, a caster fork (such as caster fork 64 of FIG. 16) and a caster wheel (such as caster wheel 65 of FIG. 16). A caster wheel frame 63 is connected to the wheelchair frame 62 and the drum receiving unit 2 is integrated into an end 66 of the caster wheel frame 63. The mounting unit 1 comprises the drum receiving unit 2 having the aperture 22, the drum assembly 3 and the bolt 4, which acts as an axle for and is connected to the caster fork. A locking nut 6 is screwed on the bolt section facing the drum assembly 3. By rotating the drum assembly 3 inside the drum receiving unit 2 prior to inserting the bolt 4, the track of the caster wheel can be adjusted between two endpoints along the aperture 22 of the drum receiving unit 2. In FIGS. 15A and 15C the drum assembly 3 is essentially fully rotated to the end point on one side of the drum receiving unit 2, whereas in FIGS. 15B and 15D the drum assembly 3 is essentially fully rotated to other side of the drum receiving unit 2.

When the aperture 22 has a different geometry, as for example described in conjunction with the FIGS. 3A to 3C, the track and/or the trail of the caster wheel can be adjusted.

As another example, a caster wheel assembly comprises the mounting unit 1 comprising the drum receiving unit 2, the drum assembly 3, and the bolt 4; a caster wheel 65 and a caster fork 64 of a wheelchair 61 is depicted in FIG. 16. Here, the caster wheel frame 63 is connected to the wheelchair frame 62, in particular by welding. The drum receiving unit 2 is integrated into an end 66 of the caster wheel frame

63. As an add-on piece, the caster fork 64 holding the caster wheel 65 is connected to the bolt 4, which acts as the rotation axis for the caster fork 64. The bolt 4 is illustrated as an angled bolt, though any of the other embodiments may be used. Therefore, by varying the screw penetration depth of the drum assembly 3 inside the drum receiving unit 2 the track can be adjusted. By varying the screw penetration depth of the bolt 4 inside the drum assembly 3 the distance of the caster fork 64 with respect to the caster frame 63 can be adjusted. In this way, the caster wheel 65 can be set to the ground, compensating for construction errors/tolerances or machining errors/tolerances which might occur during manufacturing, in particular during welding of different connections. By rotating the angled bolt 4, the camber angle and the caster angle can be adjusted. Therefore, for example, when the angle of the caster frame 63 has a small variance from the designed angle, the angled bolt 4 can be rotated to compensate the resulting camber. Typically, the bolt will have an angle of up to 2° for this compensation task, in particular 1° or 1.5°, but can be also smaller or larger depending on the design and the needs.

Alternatively or additionally, indicia for marking the alignment of the position and/or the angle of the drum assembly 3 with respect to the drum receiving unit 2, in particular for the one or more holes 34 and/or the one or more counterbores 35 to the one or more apertures 22 for the bolt 4 and/or the locking nut can be provided on the drum assembly 3 and the drum receiving unit 2.

Since the mounting unit of the invention provides a connection with an increased resilience and loadability which can be flexibly adjusted, many different parts can be attached to the wheelchair. For example, a propulsion unit, such as a an electric motor, can be attached to a manual wheelchair to convert a manual wheelchair into a power-driven wheelchair. Preferably the propulsion unit comprises at least one wheel, an electric motor, a battery and/or a control and steering device. In particular the propulsion unit can also comprise a sensor kit and/or a control unit for assisted or autonomous driving, and/or lights.

Additional add-on pieces, such as a headrest, a backrest, a footrest, an armrest, a tray, a platform, a holder, an arm, a steering device, an electronic device, a rain shelter, a sun shelter, a wind shelter, an umbrella, a sun umbrella, a modular linking system, a controller, a snow plough, a broom, a flame thrower, a sensor kit for assisted or autonomous driving, a tow hitch, an engine, a motor, a battery, a drive wheel, a caster wheel, an obstacle climbing wheel, such as a curb climbing wheel, a rear view mirror, a fork lift, a camera, a horn, a display, a light, in particular a drive light, a brake light and/or a turn light, a docking station and/or any combinations thereof can be attached. In particular the add-on piece(s) comprises at least one of a caster fork, a wheel, like a drive wheel, a caster wheel and/or an obstacle climbing wheel, such as a curb climbing wheel, drive means, like a propulsion unit for converting a manual wheelchair into a power-driven wheelchair, an engine, a motor and/or a battery, rest means, like a headrest, a backrest, an armrest and/or a footrest, support means, like a tray, a platform, a holder and/or an arm, steering means, electronic means, control means, protection means, like a rain shelter, a sun shelter, a wind shelter, an umbrella, a sun umbrella and/or a cloth shield, a modular linking system, sensor means, like a sensor kit for assisted or autonomous driving, a rear view mirror and/or a camera, a tow hitch, a fork lift, a snow plough, a broom and/or a flame thrower, signal means, like a horn, interface means, like a display, a touchscreen, a control panel and microphone, and/or a loud speaker, light means, like a drive light, a brake light and/or a turn light, and/or a docking station.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A mounting unit for adjustably mounting an add-on piece to a wheelchair frame comprising:
   at least one drum receiving unit having at least one aperture and a female thread, the drum receiving unit supported on the wheelchair frame, the wheelchair frame including a caster wheel frame and the add-on piece is a caster fork and a caster wheel attached to the caster fork;
   at least one drum assembly having at least one hole and a male thread; and
   at least one bolt, the bolt connected to the add-on piece and configured to hold the add-on piece; wherein
   the drum receiving unit is adapted to receive the drum assembly, the female thread is adapted to mate with the male thread and to allow an alignment of the position of the hole with respect to the aperture such that the bolt can be inserted through the aperture and at least partly into the hole; and
   the drum receiving unit with the drum assembly and/or the drum assembly with the bolt comprises a detachable form fit connection; and
   at least one of the drum receiving unit, the drum assembly and/or the bolt comprises a detachable force fit connection with another one of the drum receiving unit, the drum assembly and/or the bolt.

2. The mounting unit according to claim 1 wherein the drum receiving unit comprises two opposing apertures, at least one slit, and/or at least one socket.

3. The mounting unit according to claim 1 wherein at least one aperture of the drum receiving unit has at least one of a generally circular, elongated, elliptical, spiral, half-circular, rectangular, or polygonal shape.

4. The mounting unit according to claim 2 wherein the socket is adapted to operate with a fastening means for at least partly closing the slit to apply a force on the drum receiving unit, and wherein the slit comprises the aperture of the drum receiving unit through which the bolt can be inserted into the hole of the drum assembly, and the aperture of the drum receiving unit induces at least one of a force fit or form fit connection between the bolt and the drum receiving unit when the slit closes.

5. The mounting unit of claim 1 wherein the drum assembly comprises:
   at least one counterbore and at least one hole for cooperating with the bolt;
   a through hole angled relative to the one or more holes;
   at least one opening distributed across the threaded surface of the drum assembly for driving the drum assembly with a matching tool,
   at least one groove on an end face and/or at least one groove on a second end face.

6. The mounting unit of claim 5 wherein the at least one hole comprises a female thread for cooperating with the bolt, and/or the at least one groove comprises the form of a hexagon with circular shaped depressions on the six corners, a hex socket, a star socket, a hexalobular socket, a form used by screw drives or a protrusion.

7. The mounting unit of claim 1 wherein the drum assembly and/or the drum receiving unit comprises indicia for marking the orientation of the drum assembly with respect to the drum receiving unit.

8. The mounting unit of claim 1 wherein the drum assembly comprises a drum placed between two screws, at least one of the end faces of the drum comprising a conical, a hemispherical, a cylindrical, a regular polygonal, a convex or a star shape and at least one of the screws has a corresponding receiving portion matching the shape of the at least one end faces of the drum, and/or the drum being rotational symmetrical relative to a through hole extending along an axis, and/or the at least one hole extending radially to the axis.

9. The mounting unit of claim 8 wherein the female thread comprises a first part being left-handedness and a second part being right-handedness, and one of the screws matches the handedness of the first part, whereas the other screw matches the handedness of the second part.

10. The mounting unit of claim 1 wherein the at least one hole is located eccentrically on an end face of the drum assembly.

11. The mounting unit of claim 1 wherein the bolt comprises a first bolt section having a first center line, a second bolt section having a second center line and a bolt meeting section, the first bolt section includes a male thread adapted to cooperate with a female thread of the drum assembly and the second bolt section comprises one of a male thread on an outer surface or a hole comprising a female thread that cooperates with the add-on piece.

12. The mounting unit of claim 11 wherein the first center line and the second center line are offset by a displacement (D) and/or an angle ($\alpha$), the angle being in a range of 0° to 2°.

13. The mounting unit of claim 11 wherein the bolt comprises at least one locking nut located in the first bolt section and/or the second bolt section.

14. The mounting unit of claim 1 wherein the drum receiving unit, the drum assembly, and/or the bolt is/are adapted to expand and/or shrink at least in parts and in at least one direction when a force is applied.

15. The mounting unit of claim 1 wherein a cross-section of the at least one aperture of the drum receiving unit is larger than the at least one hole of the drum assembly.

16. A wheelchair comprising:
a frame and a caster support frame;
at least one add-on piece comprising a caster fork and caster wheel assembly; and
at least one mounting unit comprising:
at least one drum receiving unit having at least one aperture and a female thread, the drum receiving unit supported on the wheelchair frame;
at least one drum assembly having at least one hole and a male thread; and
at least one bolt, the at least one bolt connected to the add-on piece and configured to hold the add-on piece; wherein
the drum receiving unit is adapted to receive the drum assembly, the female thread is adapted to mate with the male thread and to allow an alignment of the position of the hole with respect to the aperture such that the bolt can be inserted through the aperture and at least partly into the hole; and
the drum receiving unit with the drum assembly and/or the drum assembly with the bolt comprises a detachable form fit connection; and
at least one of the drum receiving unit, the drum assembly and/or the bolt comprises a detachable force fit connection with another one of the drum receiving unit, the drum assembly and/or the bolt.

* * * * *